Aug. 23, 1932.  F. C. OVERBURY  1,873,213
METHOD OF AND APPARATUS FOR FINISHING ROOFING ELEMENTS
Filed Dec. 27, 1927
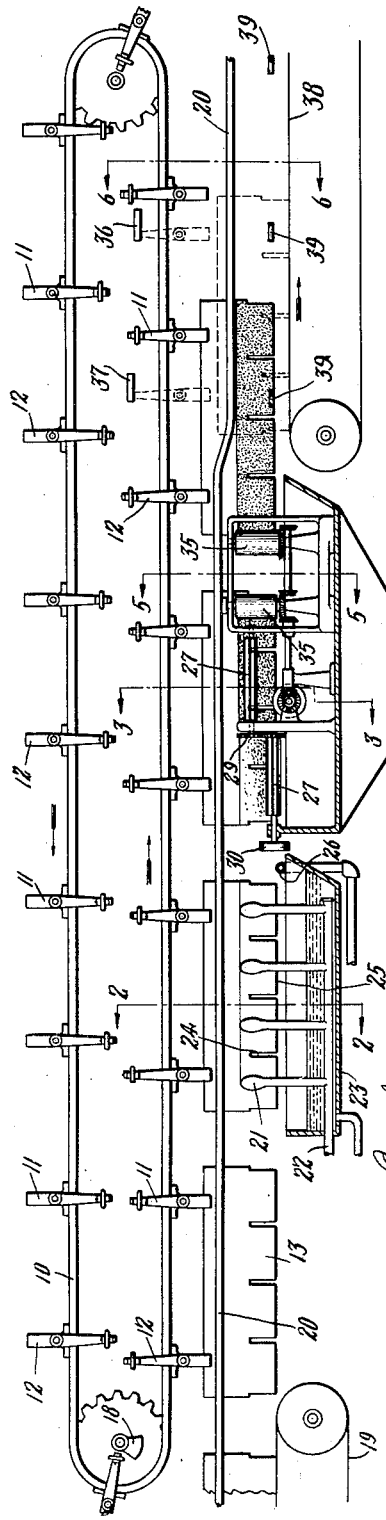
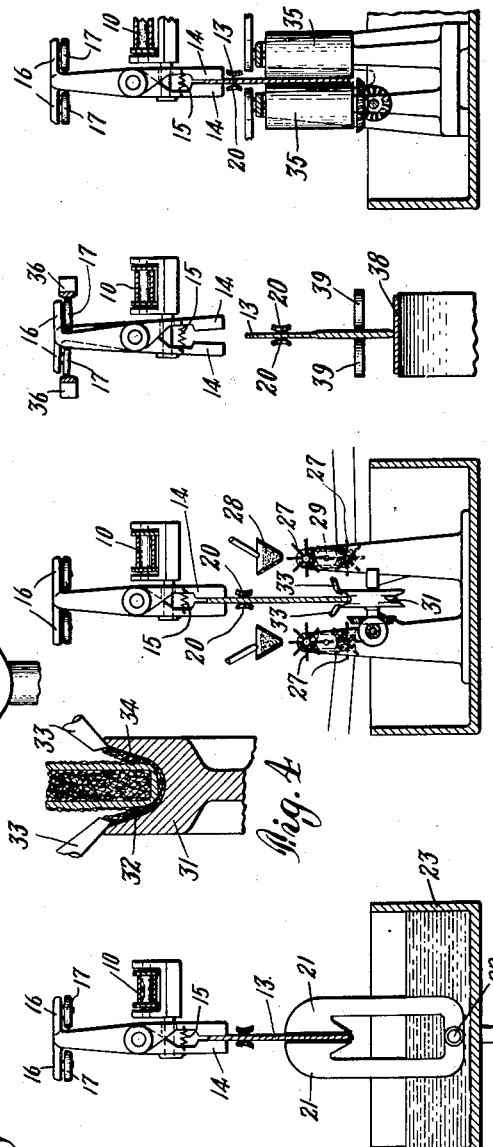
Inventor:
Frederick C. Overbury Patented Aug. 23, 1932

1,873,213

UNITED STATES PATENT OFFICE

FREDERICK C. OVERBURY, OF HILLSDALE, NEW JERSEY, ASSIGNOR, BY MESNE ASSIGNMENTS, TO THE PATENT AND LICENSING CORPORATION, OF BOSTON, MASSACHUSETTS, A CORPORATION OF MASSACHUSETTS

METHOD OF AND APPARATUS FOR FINISHING ROOFING ELEMENTS

Application filed December 27, 1927. Serial No. 242,687.

This invention has relation to a method of and apparatus for finishing a roofing element which has been cut to desired size and shape from a sheet of roofing. The sheet may be of what has heretofore been known as finished roofing, i. e., asphalt-saturated felt coated with waterproof coating and surfaced on one side with crushed slate or the like, or it may be taken in any of the intermediate stages of the process forming such a product. For example, the elements may be cut from saturated sheeting which has simply been coated, or has not been coated, or even from a sheet of raw felt which has not been saturated. Whatever the nature of the cut elements which are to be treated, the invention resides primarily in an improved method of and means for handling the elements while a layer of coating material, and, if desired, a layer of surfacing material, are applied to portions of the elements. The improved method of handling roofing elements comprises suspending them, butt edges down, successively from a moving conveyor by which they are advanced edgewise past portions of the apparatus which automatically apply the coating and surfacing materials as desired.

For a more complete disclosure of the invention, reference is had to the description which follows, and to the drawing, of which,—

Figure 1 is a diagrammatic elevation of apparatus for carrying out the invention.

Figure 2 is a section on the line 2—2 of Figure 1.

Figure 3 is a section on the line 3—3 of Figure 1.

Figure 4 is a detail of the apparatus on a larger scale.

Figure 5 is a section on the line 5—5 of Figure 1.

Figure 6 is a section on the line 6—6 of Figure 1.

Referring to the drawing in detail, 10 represents an endless conveyor of any suitable material and structure, such as a chain or belt. A series of clamps 11 and 12 are supported by the conveyor 10 and are spaced in such a way that each pair of clamps 11, 12 may grip the head portion of a roofing element such as a strip shingle 13, as illustrated in Figure 1, at points near the ends of the element. The clamps 11 and 12 may be provided with jaws 14, the jaws of each clamp being pulled toward each other as by a suitable spring 15. In order to separate the jaws of a clamp, each jaw is integral with an arm extending upwardly and turning outwardly as at 16, the outward extensions 16 having suitable rollers 17 mounted thereon. In order to open the jaws 14 automatically, a suitable pair of cams 18 is provided, between which members the rollers 17 of the clamps 11 or 12 pass as the clamps come into position to seize a roofing element. It will be observed that the clamps 11 and 12 extend upwardly to different heights for reasons to be hereinafter explained. The cam members 18 are preferably made wide enough to engage the rollers 17 of either the clamps 11 or the clamps 12. The cam 18 may comprise a pair of plates which are spaced from each other at a suitable distance to engage the rollers of a clamp passing between them and to force the rollers of the clamp toward each other in the manner indicated in Figure 6. This results in the spreading of the jaws 14. As each clamp passes the cam 18, its jaws are spread and are thus able to straddle the head portion of a roofing element 13 as it is brought up by a feeding device 19. The feeding of the roofing elements to the clamps 11 and 12 is so timed that the clamps 11 will seize the forward ends of the elements while the clamps 12 seize the rearward ends. The seizing of the head portion of the element 13 takes place when the rollers 17 pass beyond the cam 18 and permit the jaws 14 to come together. When a strip shingle 13 has been seized by a pair of clamps 11, 12, the motion of the conveyor, which is driven by any suitable means, carries the strip shingle along between a pair of guide rails 20 to apparatus for applying waterproof coating material in liquid form to one or both faces of the shingle. As shown in the drawing, this coating material may be limited to the butt portions of the faces, but it is obvious that the coating may be extended to cover more of the shingle if desired. Any desired means may be employed for applying coating material to the faces of the shingle. As shown on the drawing, the coating material, which, for example, may be a high melting-point asphalt heated to a sufficient degree of fluidity, may be flowed onto the shingle as by one or more spouts 21 which are connected as by the pipe 22 to a suitable source of supply. As indicated in Figure 2, these spouts are preferably shaped so that the jet or stream of coating material coming therefrom completely covers the portion of the face which it is desired to cover. As indicated in Figure 1, four pairs of spouts are provided, but a lesser number may be found sufficient. A pan or receptacle 23 is preferably provided to catch the excess coating which flows down the face or faces of the strips to which it is applied and drips from the butt edge thereof. It is preferred to supply the coating through the spouts 21 in sufficient quantity to insure a thorough covering not only of the faces presented to the spouts, but also of the edges of the element in the slots 24 which define tabs on the butt portion of the strip shingle and to cover thoroughly the butt edges 25 of the strip shingle. A suitable wiper such as a steam pipe 26 is preferably extended across the pan 23 and so placed that the butt edges of the shingles will wipe over the pipe 26 after leaving the spouts 21. This prevents drops or strings of asphalt or other coating material from forming on the butt edge of the shingle. The coated shingle thereupon progresses to apparatus for surfacing the coated areas with suitable comminuted or granular material, such as crushed slate, brick, tile or other matter, preferably mineral. This apparatus may comprise an air blast by which the granular particles may be blown against the coated surfaces, or it may take the form of a mechanical device such as a plurality of rapidly revolving paddle wheels 27 which are placed at different levels beneath suitable hoppers 28 from which the granular material is dropped onto the moving paddles of the wheels 27 and by them is projected against the coated areas of the suspended shingles as the latter advance with the motion of the endless carrier. The hoppers 28, which are shown in Figure 3, are not illustrated in Figure 1 in order to avoid confusion. There may be any desired number of paddle wheels 27 at graded heights to insure a thorough and even surfacing of the coated areas with grit. The two paddle wheels 27 are shown by way of illustration only. These may be driven in any suitable way such as connecting gears 29 and a pulley 30 by which the wheels may be operatively connected to suitable power means. Instead of paddle wheels 27, revolving brushes with stiff bristles or any other equivalent mechanism may be employed as desired. In order to insure a complete and thorough surfacing of the butt edges of the shingles with grit, and in order to round off the coated and surfaced butt edges, a suitable wheel 31 may be provided having a peripheral groove 32 in the rim thereof of sufficient width and depth to accommodate the butt edges of successive shingles together with a sufficient body of loose grit to surround the butt edges with a substantial layer. As the shingles 13 pass the wheel 31, the latter are preferably driven so that their peripheral speed is substantially equal to the linear speed of the shingle. As the wheel 31 revolves, streams of loose grit or other granular material are fed through suitable spouts 33 to maintain a continuous body of loose grit 34 in the groove 32 with which the butt edges of the shingles 13 may contact as they pass over the wheel 31. The wheel 31 is supported at such a height that the weight of the shingle will be carried by the butt edge as it passes over the wheel so that sufficient of the grit in the layer 34 will be pressed into adhering contact with the coating on the butt edge to completely cover and mask said coating. In order to embed more thoroughly the grit adhering to the side faces of the shingles, the latter may be run between pairs of vertical rolls 35 which are suitably spaced and shaped so as to press the surfacing layer of grit into firm engagement with the coating on the face or faces of the strips without crushing the strips. These rolls may be slightly tilted toward each other or tapered downwardly in order to finish the butt portion of each shingle with an upward taper in thickness, the thickest portion being along the butt edge. The strips are now ready to be collected and packaged for shipment. In order to release the strips from the clamps 11 and 12, suitable cams 36, 37 may be provided as indicated in Figure 1. The cam 36 as shown is at a lower level than the cam 37 and is arranged to engage the rollers 17 of the clamps 11 at the same moment as the rollers 17 of the clamps 12 are engaged by the cam 37, so that each pair of clamps 11 and 12 which support a strip shingle are opened simultaneously so that the shingle is allowed to drop on a suitable conveyor 38 and carried off for packaging. It is obvious that if the conveyor 38 be elevated so that the shingles ride onto it while still gripped by the clamps 11 and 12, the latter may be released serially by a single cam similar to the cam 18. As the shingles are liable to be somewhat soft and limp after being heated by the application of hot coating material, additional guide wheels 39 may be provided in pairs at suitably spaced intervals to support the shingles as they are carried along on the conveyor 38.

Having thus described certain embodiments of my invention, it should be evident to those skilled in the art that various changes and modifications might be made therein without departing from its spirit or scope as defined by the appended claims.

I claim:—

1. The method of treating a series of individual roofing elements, which comprises advancing the elements in succession edgewise in an upright position, with butt edge down, applying liquid coating to a face and the butt edges of each element while so advancing, projecting granular surfacing matter against the coated face, and pressing granular matter against the coated butt edge.

2. The method of treating a series of individual roofing elements, which comprises advancing each element edgewise in an upright position with butt edge down, applying liquid coating material to the butt portion of both faces of each element and to the butt edges thereof, projecting granular surfacing matter against the coated faces, and pressing granular matter against the butt edge, all during the edgewise advance of the element.

3. The method of treating a series of individual roofing elements, which comprises advancing each element edgewise in an upright position butt edge down, coating the butt portions of the faces and the butt edges with liquid waterproofing material, applying mineral surfacing matter to the coated butt edges and rounding off the edges thus surfaced, and pressing mineral surfacing matter into the coating on the faces, all during the edgewise advance of the element.

4. Apparatus for treating strip shingles which comprises an endless conveyor, a series of individual clamps carried by said conveyor and spaced along said conveyor so that each pair of clamps are adapted to engage a strip shingle at respective points adjacent to the ends thereof, means for normally holding each clamp closed, means at one point along the path of said clamps for opening the clamps successively to receive successively respective end portions of successive strip shingles, and means at another point along said path for opening said clamps in pairs whereby both ends of the shingle supported by each pair are simultaneously released.

5. Apparatus for treating strip shingles, comprising a pair of guide rails adapted to receive and guide a strip shingle edgewise between them, a belt conveyor under a portion of the length of said rails to support and move strip shingles endwise between said rails, a conveyor above a portion of said rails, having a series of spaced clamps arranged in pairs to grip the shingles carried by said belt conveyor, and to carry them for treatment, the clamps of each pair gripping respective end portions of a shingle a second belt conveyor to receive the treated shingles, and means for operating each successive pair of clamps simultaneously to release the shingles as they come upon said second belt.

6. Apparatus of the class described comprising means for conveying a strip shingle endwise with butt edge downward, means for applying waterproofing material to the faces and butt edge of said shingle while thus conveyed, and means for pressing grit against the coated butt edge, said pressing means including a wheel having a peripheral groove adapted to receive the butt edge of said shingle, and means for pouring grit into said groove where said butt edge is received.

In testimony whereof I have affixed my signature.

FREDERICK C. OVERBURY.